US011967477B1

(12) United States Patent
Worsham

(10) Patent No.: US 11,967,477 B1
(45) Date of Patent: *Apr. 23, 2024

(54) USER PROGRAMMABLE PUSHBUTTON BREAKER SWITCH

(71) Applicant: David Worsham, Santa Rosa Beach, FL (US)

(72) Inventor: David Worsham, Santa Rosa Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,771

(22) Filed: Nov. 8, 2021

Related U.S. Application Data

(63) Continuation of application No. 17/110,395, filed on Dec. 3, 2020, now Pat. No. 11,217,414.

(51) Int. Cl.
*H01H 71/58* (2006.01)
*H01H 9/16* (2006.01)
*H01H 71/04* (2006.01)
*H01H 71/06* (2006.01)
*H01H 71/74* (2006.01)

(52) U.S. Cl.
CPC ............ *H01H 71/58* (2013.01); *H01H 9/161* (2013.01); *H01H 71/04* (2013.01); *H01H 71/06* (2013.01); *H01H 71/74* (2013.01); *H01H 2009/164* (2013.01)

(58) Field of Classification Search
CPC .. H01H 9/161; H01H 2009/164; H01H 71/04; H01H 71/06; H01H 71/58; H01H 71/74
See application file for complete search history.

(56) References Cited

U.S. PATENT DOCUMENTS

| | | | | |
|---|---|---|---|---|
| 10,757,794 B1 | 8/2020 | Worsham | | |
| 2015/0221459 A1* | 8/2015 | Oneufer | H01H 9/161 200/50.26 | |
| 2017/0103861 A1* | 4/2017 | Reid | H01H 9/161 | |
| 2018/0013428 A1* | 1/2018 | Lark, Jr. | H03K 17/96 | |
| 2019/0189147 A1* | 6/2019 | Monteith | G10L 15/22 | |

* cited by examiner

*Primary Examiner* — Ramon M Barrera
(74) *Attorney, Agent, or Firm* — Gerald M. Walsh; Lanier Ford Shaver & Payne, PC

(57) ABSTRACT

A programmable pushbutton breaker switch having a pushbutton, a plurality of amperage indicating light emitting diodes (LEDs), a plurality of breaker circuits, and a plurality of LED light pipes in an interior of the pushbutton. Each of the LEDs is associated with a specific breaker circuit and with a specific light pipe. Light from a specific LED passes through a specific LED light pipe and produces an indicator light on the top of the pushbutton. The indicator light identifies an amperage amount, shown on the top of the pushbutton, of a specific breaker circuit. A programming switch inside the programmable pushbutton breaker switch allows the operation of the pushbutton to select a desired breaker amperage amount from a plurality of breaker amperage amounts shown on the top of the pushbutton and to set and store the desired amperage amounts in the programmable pushbutton breaker switch.

10 Claims, 7 Drawing Sheets

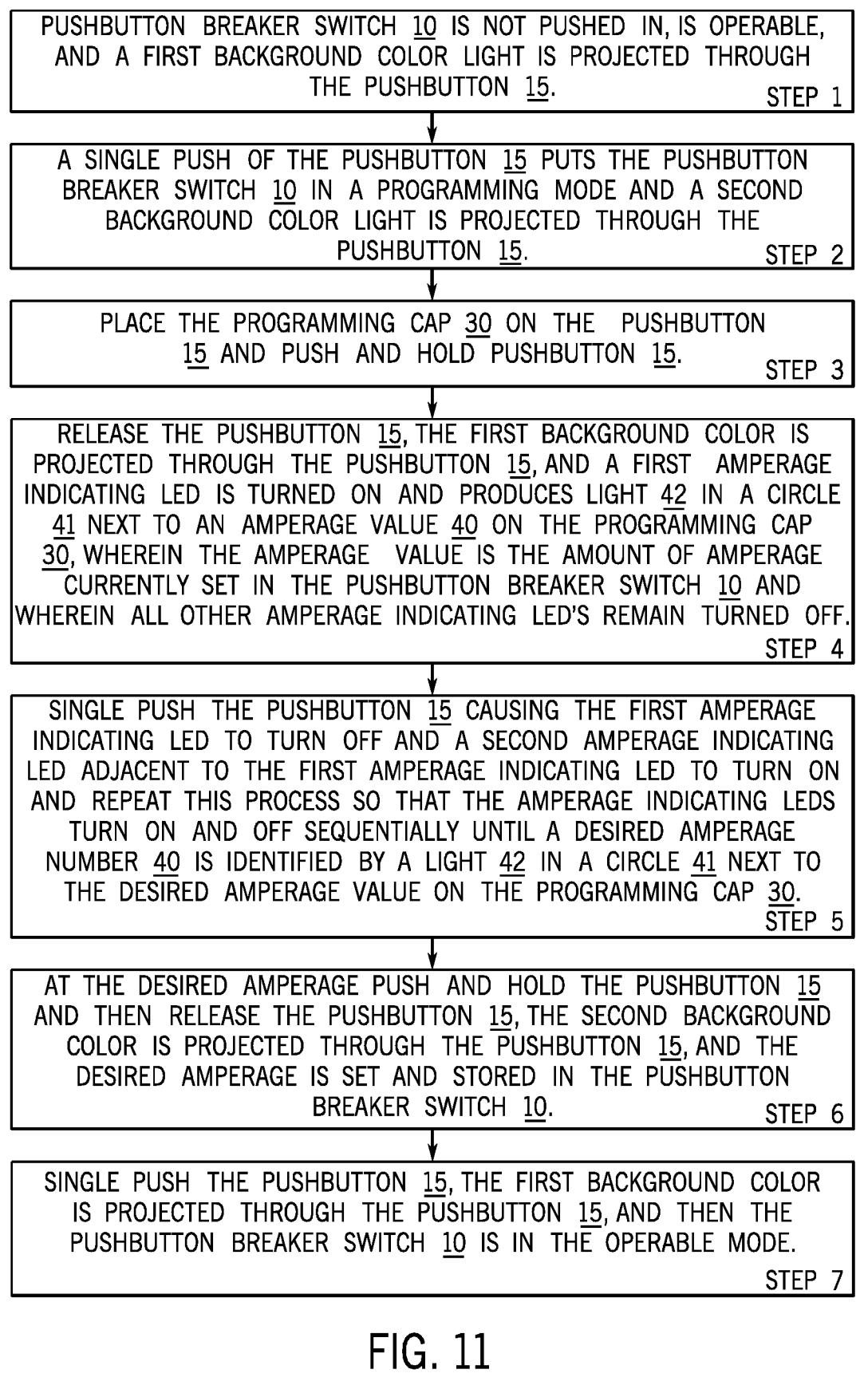

PUSHBUTTON BREAKER SWITCH 10 IS NOT PUSHED IN, IS OPERABLE, AND A FIRST BACKGROUND COLOR LIGHT IS PROJECTED THROUGH THE PUSHBUTTON 15. STEP 1

↓

A SINGLE PUSH OF THE PUSHBUTTON 15 PUTS THE PUSHBUTTON BREAKER SWITCH 10 IN A PROGRAMMING MODE AND A SECOND BACKGROUND COLOR LIGHT IS PROJECTED THROUGH THE PUSHBUTTON 15. STEP 2

↓

PLACE THE PROGRAMMING CAP 30 ON THE PUSHBUTTON 15 AND PUSH AND HOLD PUSHBUTTON 15. STEP 3

↓

RELEASE THE PUSHBUTTON 15, THE FIRST BACKGROUND COLOR IS PROJECTED THROUGH THE PUSHBUTTON 15, AND A FIRST AMPERAGE INDICATING LED IS TURNED ON AND PRODUCES LIGHT 42 IN A CIRCLE 41 NEXT TO AN AMPERAGE VALUE 40 ON THE PROGRAMMING CAP 30, WHEREIN THE AMPERAGE VALUE IS THE AMOUNT OF AMPERAGE CURRENTLY SET IN THE PUSHBUTTON BREAKER SWITCH 10 AND WHEREIN ALL OTHER AMPERAGE INDICATING LED'S REMAIN TURNED OFF. STEP 4

↓

SINGLE PUSH THE PUSHBUTTON 15 CAUSING THE FIRST AMPERAGE INDICATING LED TO TURN OFF AND A SECOND AMPERAGE INDICATING LED ADJACENT TO THE FIRST AMPERAGE INDICATING LED TO TURN ON AND REPEAT THIS PROCESS SO THAT THE AMPERAGE INDICATING LEDS TURN ON AND OFF SEQUENTIALLY UNTIL A DESIRED AMPERAGE NUMBER 40 IS IDENTIFIED BY A LIGHT 42 IN A CIRCLE 41 NEXT TO THE DESIRED AMPERAGE VALUE ON THE PROGRAMMING CAP 30. STEP 5

↓

AT THE DESIRED AMPERAGE PUSH AND HOLD THE PUSHBUTTON 15 AND THEN RELEASE THE PUSHBUTTON 15, THE SECOND BACKGROUND COLOR IS PROJECTED THROUGH THE PUSHBUTTON 15, AND THE DESIRED AMPERAGE IS SET AND STORED IN THE PUSHBUTTON BREAKER SWITCH 10. STEP 6

↓

SINGLE PUSH THE PUSHBUTTON 15, THE FIRST BACKGROUND COLOR IS PROJECTED THROUGH THE PUSHBUTTON 15, AND THEN THE PUSHBUTTON BREAKER SWITCH 10 IS IN THE OPERABLE MODE. STEP 7

FIG. 11

USER PROGRAMMABLE PUSHBUTTON BREAKER SWITCH

CROSS REFERENCE TO RELATED APPLICATION

This patent application is a continuation of currently pending U.S. patent application Ser. No. 17/110,395, filed Dec. 3, 2020.

FIELD OF THE INVENTION

This invention relates to pushbutton switches and, more particularly, to a programmable pushbutton breaker switch that is user programmable electronically through a pushbutton on the pushbutton switch.

BACKGROUND OF THE INVENTION

Programmable pushbutton switches are known wherein several wires exit the back end of a switch to provide power to the switch and output to various devices. These wires include positive and negative wires from a power supply, positive output amperage regulating wires, and positive output wires. Only about 2 amperages can be programmed manually into the switch by connecting one or more output wires together. If a switch is configured to put out 5 amps then to change the amperage to supply 15 amps it will be necessary to rearrange the connections of the wires. The wires will have to be accessed, exposed, disconnected from each other and if a different range of amperages is needed, for example 2.5 and 10 amps, a different switch with that configuration will have to be used. This method of manual programming the switch is time consuming and relatively inefficient.

U.S. Pat. No. 10,757,794 discloses a user programmable pushbutton switch system having a central processing unit wherein the switch is programmed with a remote controller. The remote controller can program current, a timer, and a flasher to operate at desired values in the push button switch. However, a pushbutton breaker switch providing a system and method for selecting one of several breaker amperages, using only the pushbutton to select and store the desired breaker amperage, is not known. Such a system and method would provide a simple, easy, and quick way to set the correct breaker amperage in a push button breaker switch for a given device. In addition, such a pushbutton breaker switch could be used with a range of devices requiring different breaker amperages.

SUMMARY OF THE INVENTION

This invention is a programmable pushbutton breaker switch having a housing with a top end, a bottom end, and an interior. A pushbutton is positioned in the interior at the top end of the housing. An integrated LED circuit board is connected to a plurality of amperage indicating light emitting diodes (LEDs) and is mounted on a support structure in the interior of the housing and below the pushbutton. A plurality of breaker circuits is on an integrated breaker circuit board in the interior of the housing with the integrated breaker circuit board mounted on the support structure. A plurality of LED light pipes is in an interior of the pushbutton. Each of the LEDs are associated with a specific breaker circuit and with a specific light pipe. The plurality of light pipes and the pushbutton are constructed so that light from a specific LED passes through a specific LED light pipe and produces an indicator light on the top of the pushbutton. The indicator light identifies an amperage amount, shown on the top of the pushbutton, of a specific breaker circuit. A programming switch is mounted on the support structure and is constructed so that the programming switch is turned on when the pushbutton is pushed inward into the interior of the housing and is turned off when the pushbutton is not pushed into the interior of the housing.

Turning the programming switch on and off provides electrical signals to a computer system mounted on the support structure. Electrical signals from the programming switch are processed by the computer system to allow the operation of the pushbutton to select a desired breaker amperage amount from a plurality of breaker amperage amounts shown on the top of the pushbutton and to set and store the desired amperage amounts in the computer system.

The light pipes are held in a light pipe mounting member positioned in an interior of the pushbutton. The light pipe mounting member has a plurality of evenly spaced apart channels for holding the light pipes and having a hollow interior for allowing transmission of background light from a background LED mounted on the integrated LED circuit board.

A programming cap is attached removably to the top of the pushbutton, the pushbutton cap having amperage amount numbers printed thereon, the amperage amount numbers being aligned with the light pipes and each amperage amount number indicating the amperage amount of the specific breaker circuit of the specific light pipe with which the amperage amount number is aligned.

A programming switch mounted on the support structure and is constructed so that the programming switch is turned on when the pushbutton is pushed inward into the interior of the housing and the programming switch is turned off when the pushbutton is not pushed into the interior of the housing. A single push of the pushbutton places the programmable pushbutton breaker switch into a programming mode. Pushing and holding and then releasing the pushbutton identifies, with an indicator light on the top of the pushbutton, a broker amperage amount currently set in the programmable pushbutton breaker switch. Single pushes of the pushbutton allow selections of breaker amperage amounts, from a plurality of amperage amounts, identified by an indicator light on the top of the pushbutton. Pushing and holding the pushbutton and releasing the pushbutton then sets and stores a selected breaker amperage. A single push of the pushbutton then returns the programmable pushbutton breaker switch to an operable mode.

An advantage of the programmable pushbutton breaker switch of the present invention is a pushbutton that allows a user to select a breaker amperage amount for the breaker switch and set and store this amount in the breaker switch.

Another advantage is the ability to select and set up to at least 8 different breaker amperage amounts for the breaker switch.

Another advantage is an indicator light on the top of the push button that can be advanced through a series of breaker amperage amounts using the pushbutton to select, set, and store a desired amperage amount in the breaker switch.

Another advantage is a programming cap that can be removably placed on the top of the push button to program the breaker switch for a desired breaker amperage amount and which can be replaced with a label cap.

BRIEF DESCRIPTION OF THE FIGURES

FIG. 1 shows a cutaway perspective view of a pushbutton breaker switch of the present invention with the pushbutton not pushed in.

FIG. 5A shows a top perspective view of the programming cap in place on top of the pushbutton with the pushbutton not pushed in.

FIG. 5B shows a top perspective view of the programming cap in place on top of the pushbutton with the pushbutton pushed in.

FIG. 11 is a flow chart illustrating a method of using the pushbutton to program the pushbutton breaker switch to select and store a breaker amperage.

DETAILED DESCRIPTION OF THE INVENTION

While the following description details the preferred embodiments of the present invention, it is to be understood that the invention is not limited in its application to the details of arrangement of the parts or steps of the methods illustrated in the accompanying figures, since the invention is capable of other embodiments and of being practiced in various ways.

Figure 1:
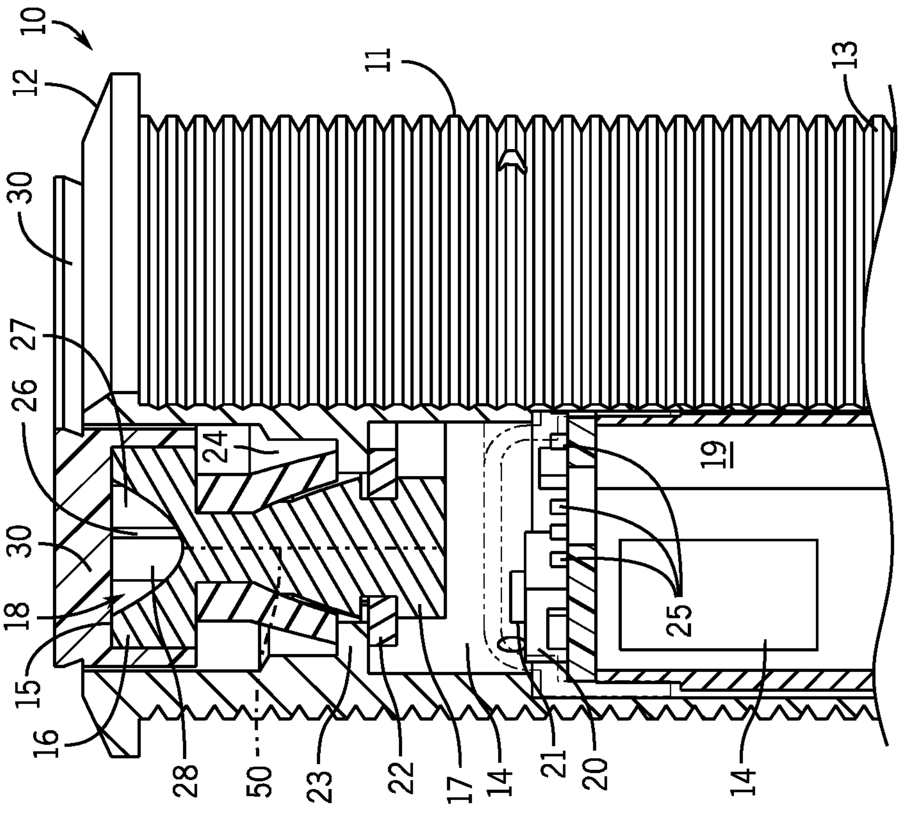
Figure 6B:
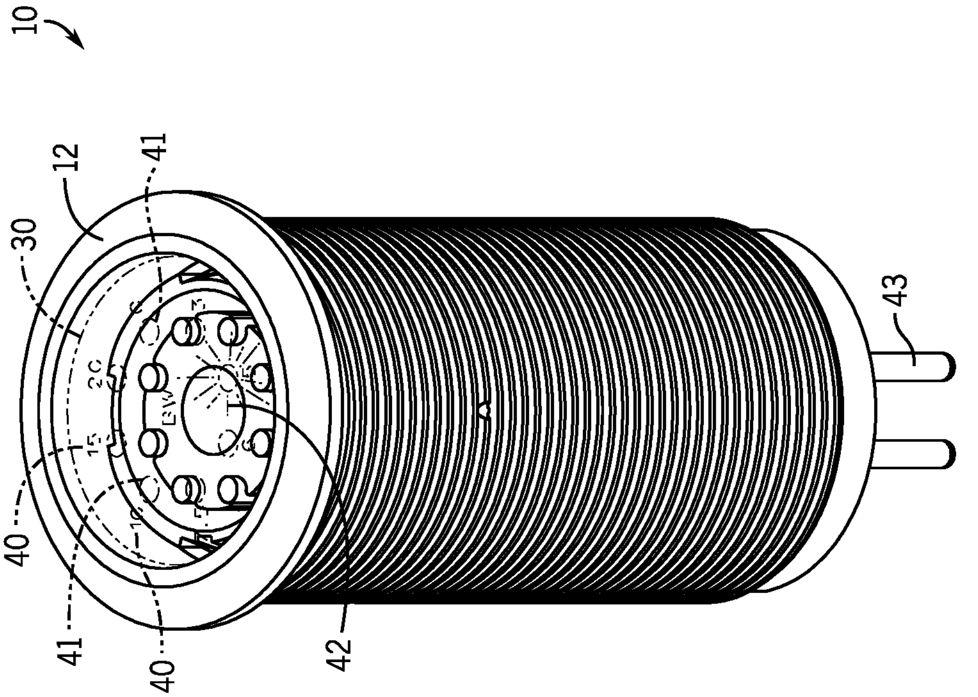
FIG. 6B shows a top perspective view of the programming cap, in transparent form, in place on top of the pushbutton after the pushbutton has had a single push after the condition shown in FIG. 6A.

FIG. 1 shows a cutaway perspective view of a programmable pushbutton breaker switch 10 of the present invention with a pushbutton 15 not pushed in. The pushbutton breaker switch 10 has a housing 11, a top end 12 and a bottom end 13 with multipin electrical connections 43 (see FIGS. 6A and 6B). The housing 11 has an interior 14. The pushbutton 15 is positioned in the interior 14 at the top end 12 of the housing 11. The pushbutton 15 has a top end 16, a bottom end 17 and a hollow interior 18. A support structure 19 is mounted in the interior 14 of the housing below the bottom end 17 of the pushbutton 15. A programming switch 20, preferably a microswitch, is mounted on the support structure 19 below the bottom end 17 of the pushbutton 15. The programming switch 20 is operated by a pushbutton 21 on top of the programming switch 20. Stop members 22 are positioned on the pushbutton 15 near the bottom end 17 of the pushbutton 15. The stop members 22 are positioned below an internal ridge 23 or flange on the inside wall of the interior 14 of the housing 11. The stop members 22 prevent the pushbutton 15 from extending out of the top end 12 of the housing 11. A spring-like member 24 is positioned around the pushbutton 15 between the top end 16 of the push button 15 and the internal ridge 23. The spring-like member 24 biases the pushbutton 15 into a not pushed in position.

A circular array of amperage indicating light emitting diodes (LEDs) 25 are mounted on the support structure 19. Each LED 25 is also aligned with a light pipe 26. Each light pipe 26 is mounted vertically in a light pipe mounting member 27 in the interior 18 of the pushbutton 15. The light from an LED 25 only passes through the light pipe 26 with which it is aligned and out through the top end of the light pipe 26. A programming cap 30 is shown placed on top end 16 of the pushbutton 15.

Figure 2:
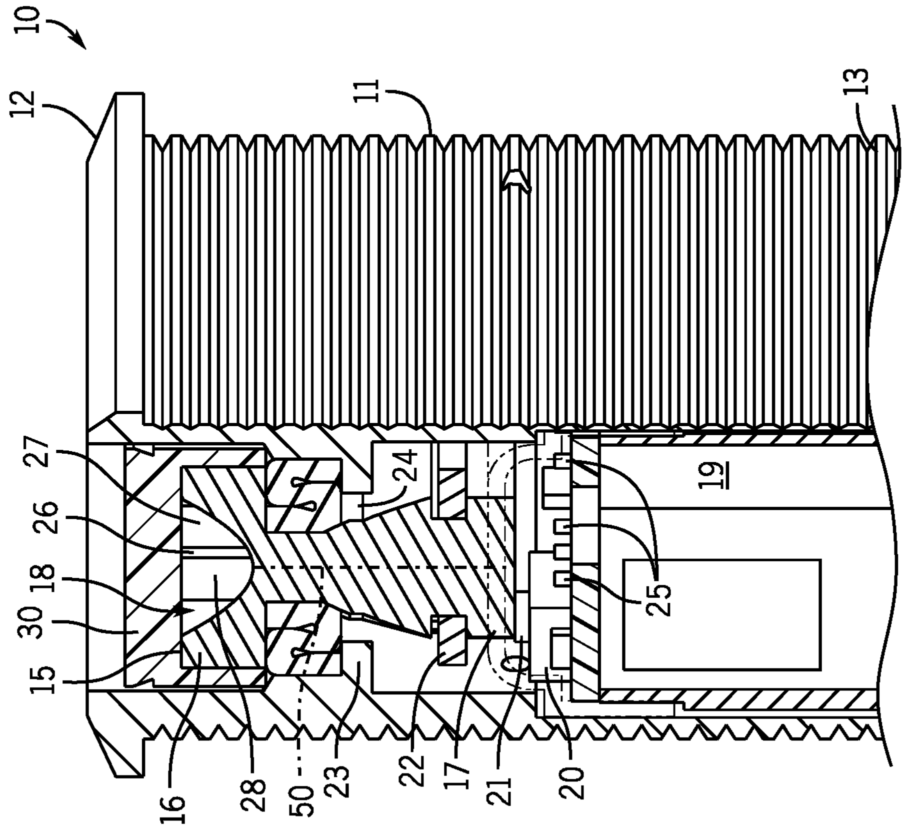
FIG. 2 shows a cutaway perspective view of the pushbutton breaker switch with the pushbutton pushed in and thereby pushing in a pushbutton on a programming switch.

FIG. 2 shows a cutaway perspective view of the pushbutton breaker switch 10 with the pushbutton 15 in pushed in position, pushing in the pushbutton 21 on the programming switch 20. When the pushbutton 15 is pushed inward into the housing 11 the bottom end 17 of the pushbutton 15 pushes the pushbutton 21 on the programming switch 20 inward. The programming switch 20 is then turned on, forming an electrical connection through the programming switch 20. In addition, the spring-like member 24 is compressed. When a pushing force is no longer applied to the pushbutton 15, the push button 15 is pushed upward by the force of the compressed spring-like member and away from and off of the pushbutton 21. The pushbutton 21 is biased in an outward (off) position so the programming switch 20 is returned to an off position, forming no electrical connection through the programming switch 20 as the pushbutton 15 is pushed upward to its resting position.

Figure 3:
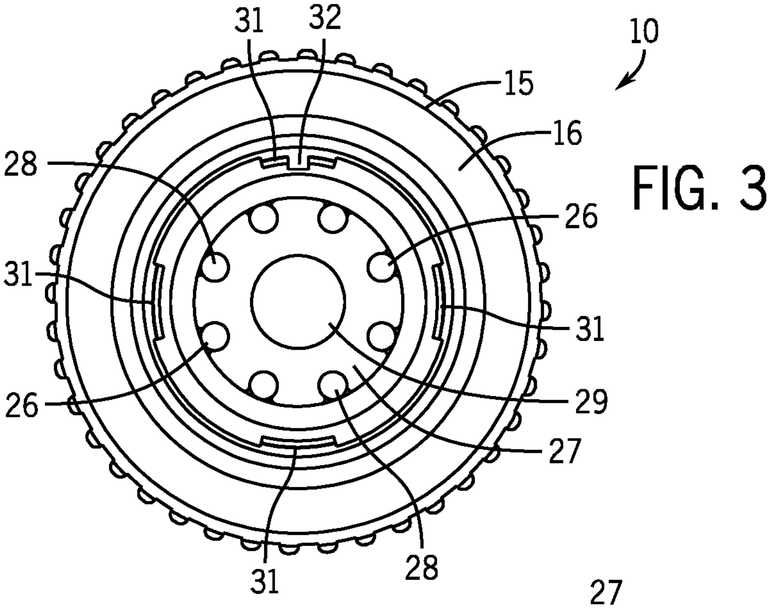
FIG. 3 is an enlarged top view of the pushbutton breaker switch and of the pushbutton.

FIG. 3 is an enlarged top view of the pushbutton breaker switch 10 and of the pushbutton 15. The perimeter at the top end 16 of the pushbutton 15 has four evenly spaced grooves 31 designed for reversibly retaining the programming cap 30 in place on the top end 16 of the pushbutton 15. One of these grooves, for example at a 12:00 o'clock position, has a locking guide 32 so that the programming cap 30 can be retained on the top 16 of the pushbutton 15 in only one orientation. A light pipe mounting member 27 is shown positioned in the interior 18 of the pushbutton 15. The light pipe mounting member 27 has eight evenly spaced light pipe channels 28 for maintaining each light pipe 26 approximately parallel to the longitudinal axis 50 (see FIGS. 1 and 2) of the pushbutton 15. The light pipe mounting member 27 has a hollow interior 29 which allows a red, green, blue background LED on a LED integrated circuit board 51 (see FIG. 4) to project light of various colors to the top end 16 of the pushbutton 15. The light pipe is made, preferably, of any suitable optical fiber material.

Figure 4:
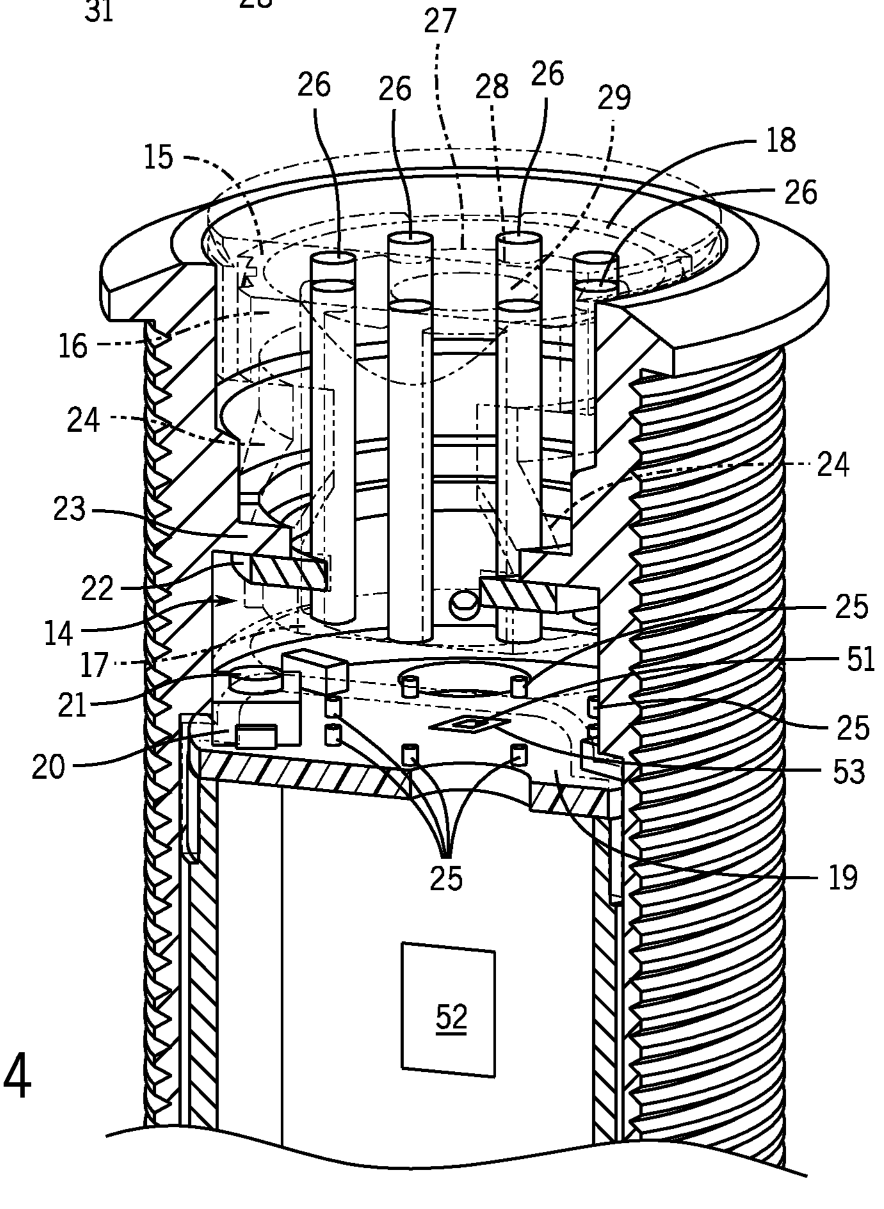
FIG. 4 is a cutaway perspective view of the pushbutton breaker switch showing light pipes positioned in an interior of the push button, light emitting diodes (LEDs), an LED integrated circuit, and a breaker integrated circuit.

FIG. 4 is an enlarged cutaway perspective view of the pushbutton breaker switch 10 in a resting position, showing light pipes 26 positioned in an interior 18 of the pushbutton 15, amperage indicating light emitting diodes LEDs 25, an LED integrated circuit board 51 having a background LED 53, and a breaker integrated circuit board 52. The LED integrated circuit board 51 and the breaker integrated circuit board 52 have computer processor, memory, and programming functions (see FIG. 12).

Figure 5A:
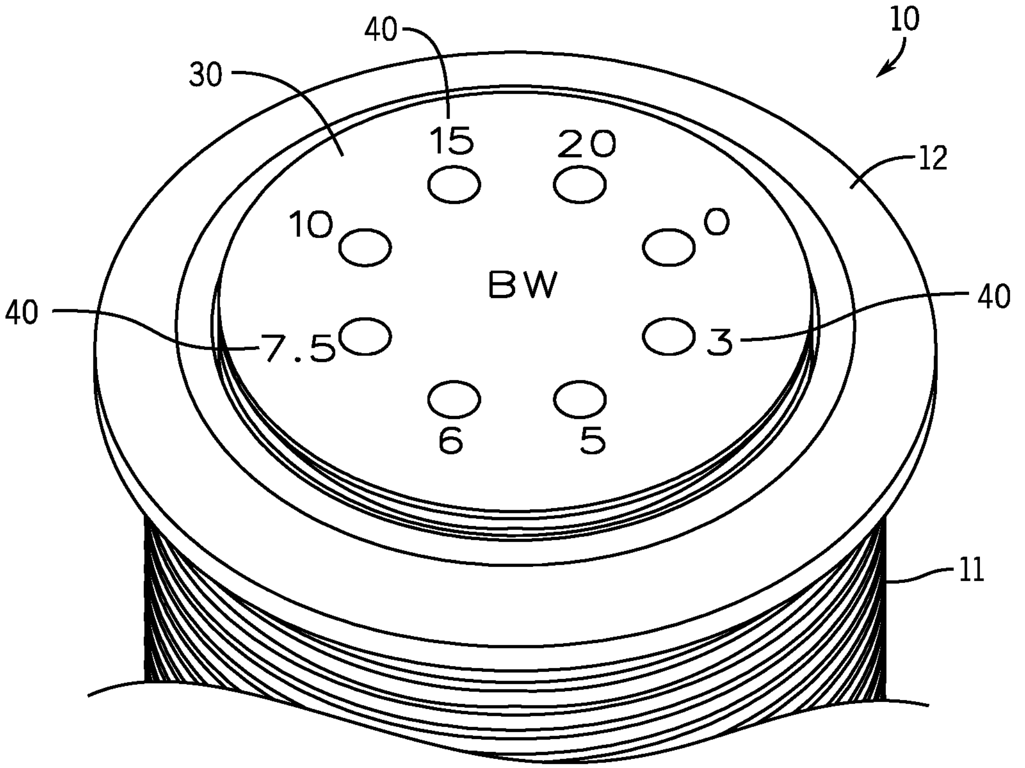
Figure 5B:
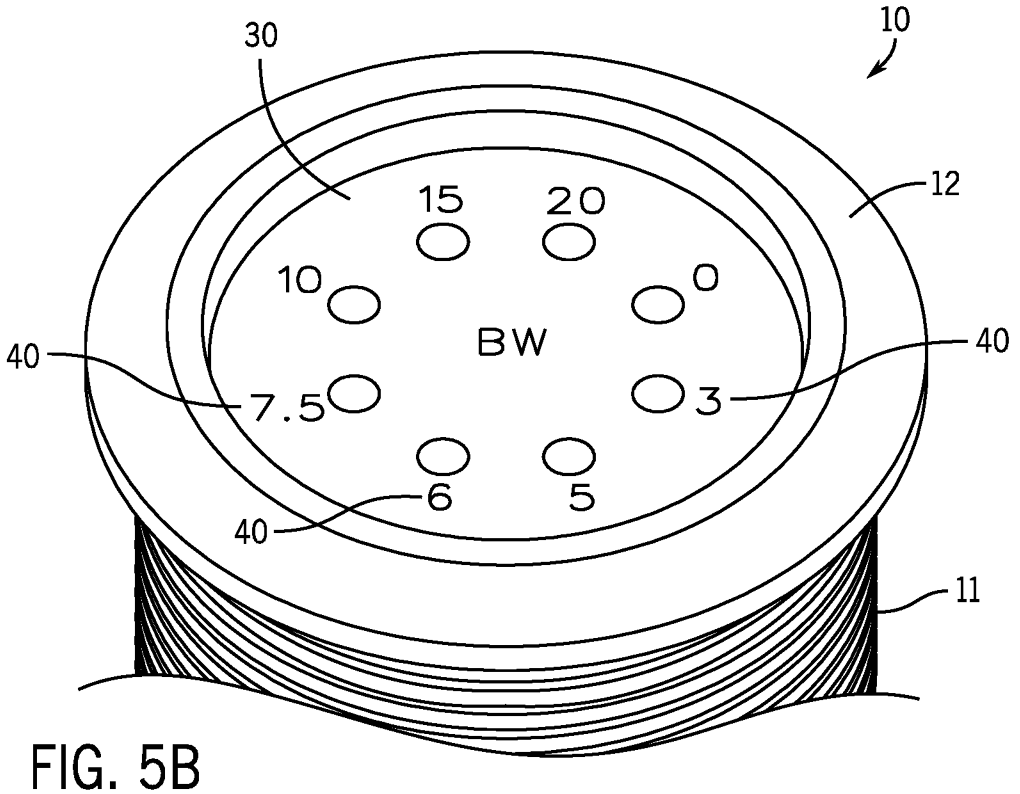

FIG. 5A shows a top perspective view of the programming cap 30 in place on top of the pushbutton 15 with the pushbutton 15 not pushed in. FIG. 5B shows a top perspective view of the programming cap 30 in place on top of the pushbutton 15 with the pushbutton 15 in a pushed in position. There are amperage numbers 40 on the face of the programming cap 30 which are evenly spaced, proceed in a given sequence clockwise 15, 20, 0, 3, 5, 6, 7.5 and 10, 25, as an example, and which indicate the amounts of breaker amperage available for use in the pushbutton breaker switch 10. Next to each number is a circle which is positioned directly over a specific light pipe. When the pushbutton 15 is pushed in sufficiently to push in the pushbutton 21 on the programmable switch 20 momentarily to briefly allow electrical current to flow through programmable switch 20, for example, for less than one second, this type of push is referred to as a single push. If the pushbutton 15 is pushed in and held pushed in for four seconds or longer, for example, this type of push is referred to as a push and hold or push and held. If the pushbutton breaker switch 10 is in an operable mode a first color light shows through the pushbutton 15. A single push of the pushbutton 15 places the pushbutton breaker switch 10 in a programming mode and a second color light shows through the pushbutton. A single push of the pushbutton 15 again places the pushbutton breaker switch 10 back into the operable mode, and so on.

Figure 6A:
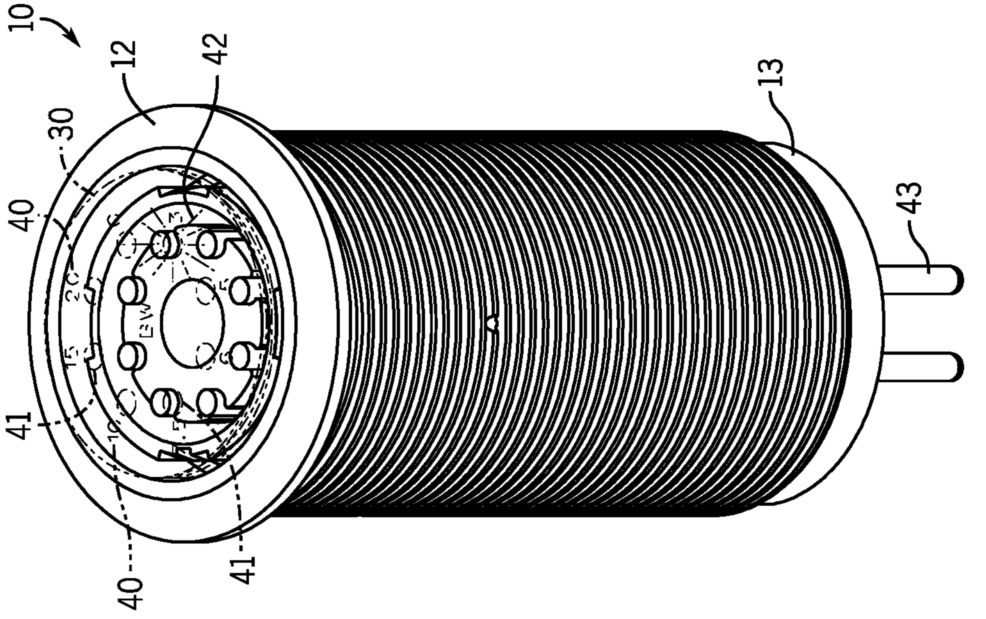
FIG. 6A shows a top perspective view of the programming cap, in transparent form, in place on top of the pushbutton after the pushbutton has been pushed and held and then released.

FIG. 6A shows a top perspective view of the programming cap 30, in transparent form, in place on top of the pushbutton 15 after the pushbutton 15 has been pushed and held and then released after the pushbutton breaker switch 10 has been placed in the programming mode. Circles 41 are positioned in line with the top ends of the LED light pipes 26. Light shining through a top end of the light pipe 26 will shine through the circle 41 in line with the LED light pipe 26 and the light 42 in the circle 41 is visible. The LED light pipe 26 will produce light 42 in the circle 41 next to the amperage value 40 that is currently set and stored in the pushbutton breaker switch 10. In FIG. 6A, the number "3" is shown next to the lit circle 41 and is the currently set and stored amperage value. A single push of the pushbutton 15 will light up a circle adjacent to number "3", as shown by the lit circle 41 next to "5" in FIG. 6B. Continued single pushes of the pushbutton 15 will advance the light into circles 41 further sequentially through the amperage readings from 6 to 7.5 to 10 to 15 to 20 to 0, and so on back to 3, as indicated by the arrow in FIG. 6B. When a desired amperage amount 40 is highlighted by light 42 in the circle 41 next to the desired amperage, the desired amperage amount 40 can be set and stored in the pushbutton breaker switch 10 by pushing and holding the pushbutton 15 for four seconds, for example, and then releasing the pushbutton 15. A single push thereafter will place the pushbutton breaker switch 10 in an operable mode, which is explained in greater detail below.

Figure 7:
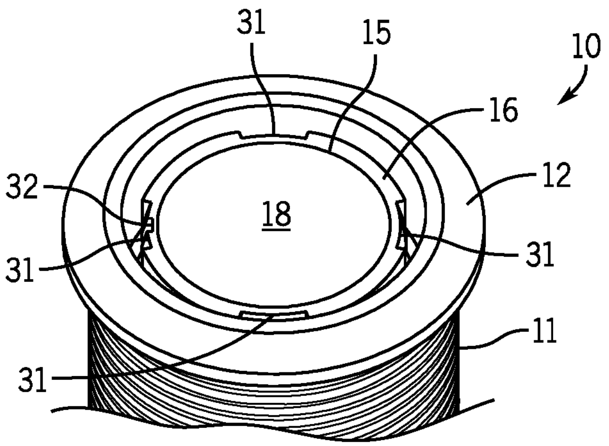
FIG. 7 shows an enlarged top perspective view of the pushbutton breaker switch and of the pushbutton with a light pipe mounting member removed from an interior of the pushbutton.
Figure 8:
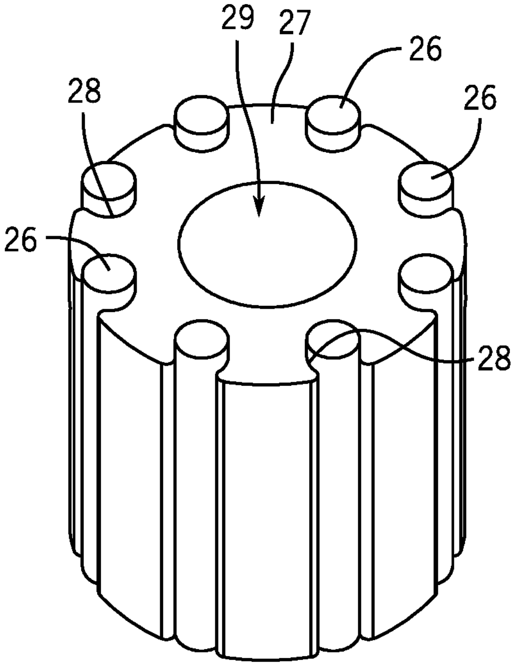
FIG. 8 shows an enlarged perspective view of the light pipe mounting member.
Figure 9:
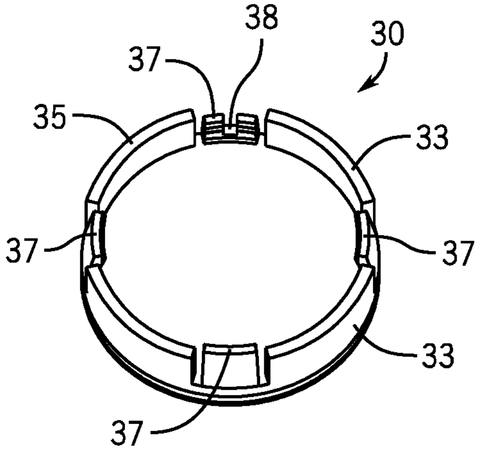
FIG. 9 is an enlarged perspective view of an underside of the programming cap.
Figure 10:
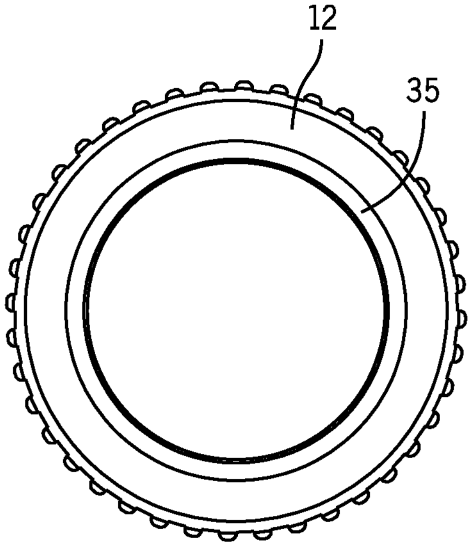
FIG. 10 is an enlarged view of a label cap that replaces the programming cap and fits on top of the pushbutton.

FIG. 7 shows an enlarged top perspective view of the pushbutton breaker switch 10 and of the pushbutton 15 with the light pipe mounting member 27 removed from the interior 18 of the pushbutton 15. FIG. 8 shows an enlarged perspective view of the light pipe mounting member 27. FIG. 9 is an enlarged view of the programming cap 30 that fits on top of the pushbutton 15. The pushbutton cap 30 is cylindrical having a side 33 with a bottom end 35 forming an interior 36. Four evenly spaced flexible retaining tabs 37 are formed in the side 33. The retaining tabs 37 engage the grooves 31 in the top end 16 of the pushbutton 15 for reversibly retaining the programming cap 30 in place on the top 16 of the pushbutton 15. One of the retaining tabs 37 has a locking groove 38 to engage the locking guide 32 (see FIG. 3). FIG. 10 shows an example of a label cap 39 that replaces the programming cap 30 after an amperage has been selected, set, and stored in the pushbutton breaker switch 10. The label cap 39 indicates a device that the pushbutton breaker switch protects, for example a blower.

FIG. 11 is a flow chart illustrating a method of using the pushbutton 15 to program the pushbutton breaker switch 10 to select and store a breaker amperage 40. When the pushbutton 15 is not pushed in and the pushbutton breaker switch 10 is operable (transmitting electrical current to a device) a first background color light, for example red, is projected through the pushbutton 15 from the background LED mounted on the LED integrated circuit board 51 (Step 1). A single push of the pushbutton 15 places the pushbutton breaker switch 10 in a breaker amperage programming mode and a second background color replaces the first background color and is projected through the pushbutton 15 from the background LED (Step 2). A programming cap 30 is placed on top of the pushbutton 15 and appears as shown in FIG. 5A. The background light makes indicia on the pushbutton cap 30 visible and readable. The pushbutton 15 is then pushed and held for a period of time, for example four seconds, which causes the programming switch 20 to be turned on for that period of time (Step 3). The pushbutton 15 is then released to its resting position, the second background color is replaced with the first background color, and a first amperage indicating LED 25 is turned on. The first amperage indicating LED produces a light signal 42 in a circle 41 next to the amperage number 40 that is the amperage currently set and stored in the pushbutton breaker switch 10 (Step 4). Pushing the pushbutton 15 with a single push will cause the first amperage indicating LED to turn off and a second amperage indicating LED adjacent to the first amperage indicating LED to turn on. Adjacent can be programmed to be to the left (clockwise) or to the right (counterclockwise) of the first amperage indicating LED. The single push of the pushbutton 15 is repeated so that the amperage indicating LEDs turn on and off sequentially in a given direction until a desired amperage number is identified by a light 42 in a circle 41 next to the amperage value 40 on the programming cap 30 (Step 5). At the desired amperage push and hold the pushbutton 15 and then release the pushbutton 15. The second background color is projected through the pushbutton 15, and the desired selected amperage is set and stored in the pushbutton breaker switch 10 (Step 6). Single pushing the pushbutton 15 again will cause the first background color to be projected through the pushbutton 15 and programming cap 30, and the pushbutton breaker switch 10 is then in an operable mode. The programming cap 30 can be replaced with a label cap 39.

Figure 12:
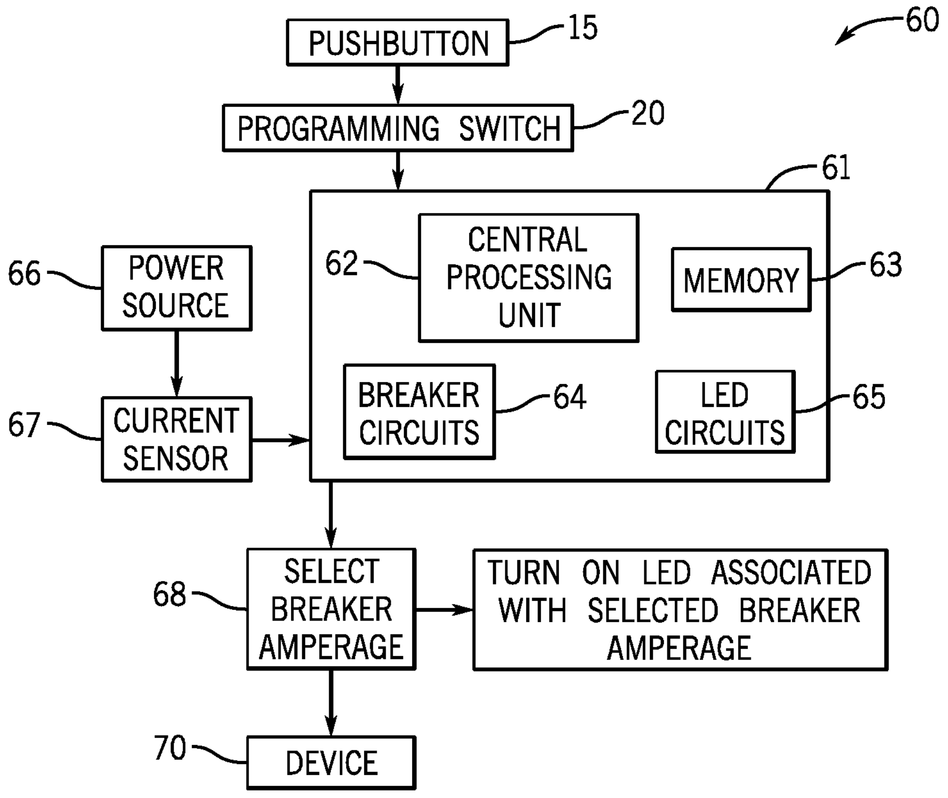
FIG. 12 provides a schematic block diagram of a computer system inside the pushbutton breaker switch for implementing the programming of the pushbutton breaker switch.

FIG. 12 provides a schematic block diagram of a computer system 60 inside the pushbutton breaker switch 10 for implementing the programming of the pushbutton breaker switch 10. The various embodiments disclosed herein can be implemented, for example, using one or more well-known computer systems, such as computer system 60. Computer system 60 can be any well-known computer system capable of performing the functions described herein. Computer system 60 includes a computer 61 having a processor 62 (also called a central processing unit or CPU). The computer system 60 also includes user input devices such as pushbutton 15 and programming switch 20 and output devices such as breaker circuits 64 and LED circuits 65. The LED circuits include amperage indicating LEDs and one or more red, green, blue background color LEDs. The computer 61 also includes a memory function 63 that stores control logic (i.e., computer software) and data and a power source 66 with a current sensor 67. The computer 61 associates a given breaker circuit with a given LED circuit, preferably in a sequence of repeated single pushes of the pushbutton 15.

There may be additional programming switches for redundancy. The computer 61 is mounted on the support structure 19.

Single pushes of the pushbutton 15 produce single pushes of push button 21 of the programming switch 20. Pushing and holding the pushbutton 15 produces pushing and holding of the pushbutton 20 of the programming switch 20. Single pushes provide input signals of relatively short duration from the programming switch 20 to the computer 61. Pushing and holding provides input signals of relatively longer duration from the programming switch 20 to the computer 61. A single push of the pushbutton 15 when the pushbutton breaker switch is in an operable mode will put the pushbutton breaker switch in the programming mode. Placing the programming cap on the pushbutton 15 and pushing and holding the pushbutton 15 and then releasing the pushbutton 15 will, after a programmed amount of time, turn on the amperage indicating LED associated with the breaker amperage amount that is currently set and stored in the computer 61. The light from this LED is projected up the light pipe associated with this LED and shines through a circle on the programming cap. The lit circle on the programming cap is next to the amperage amount number that is the currently set and stored amperage amount in the pushbutton breaker switch. The lit circle provides a visual indicator of the current amperage amount.

A single push of the pushbutton 15 will then turn off this LED associated with the current breaker amperage amount and turn on a second amperage indicating LED associated with a next higher amperage available. This second LED shines light through its light pipe into the circle next to the corresponding number for that next higher amperage. This next higher amperage is then considered selected by the computer 61 because the sequence of LEDs is synchronized with a corresponding sequence of breaker amperages in the computer 61. Repeated single pushes of the pushbutton 15 will light up the circles sequentially with sequentially increasingly higher amounts of amperage. After the highest amount of amperage is selected (highlighted circle) with the pushbutton 15, the sequence repeats (recycles) with continued single pushes of the pushbutton 15. Instead of the sequence proceeding from lower to higher amperage amounts the computer could also be programmed for the sequence to proceed from higher to lower amperage amounts or to proceed in any other desired sequence. Whatever sequence is selected the amperage indicating LEDs will always be synchronized with the breaker amperage amounts based on the desired sequence.

Single pushes of the pushbutton 15 will select the desired amount of amperage 68 when the LED associated with the desired amount of amperage turns on 69. The pushbutton 15 is then pushed and held for a specific amount of time and then the pushbutton 15 is released. The selected desired amount of amperage is then set and stored in the computer 61 and no amperage indicating LEDs are turned on. A single push of the pushbutton 15 will then return the pushbutton breaker switch to an operable mode. The set amount of amperage will then be used when operating the device 70 connected to the breaker switch.

Computer 61 can also be programmed to turn on a background LED with a desired color when the pushbutton switch is in an operable mode and in a programming mode. The background LEDs can also be programmed to flash to indicate a time to release the pushbutton 15 after it has been pushed and held. The amperage indicating LEDs can be programmed to produce flashing light or constant light. For example, an amperage indicating LED indicating a currently set amperage on the programming cap may use a constant light but use a flashing light for selecting other amperages to reset the pushbutton breaker switch.

The foregoing description illustrates and describes the disclosure. Additionally, the disclosure shows and describes only the preferred embodiments but, as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A programmable pushbutton breaker switch, comprising:

a) a housing having a top end, a bottom end, and an interior;

b) a pushbutton positioned in the interior at the top end of the housing;

c) an integrated LED circuit board connected to a plurality of amperage indicating light emitting diodes (LEDs) mounted on a support structure in the interior of the housing and below the pushbutton;

d) a plurality of breaker circuits on an integrated breaker circuit board in the interior of the housing mounted on the support structure;

e) a plurality of LED light pipes in an interior of the pushbutton; and f) each of the LEDs being associated with a specific breaker circuit and with a specific light pipe, wherein the plurality of light pipes and the pushbutton are constructed so that light from a specific LED passes through a specific LED light pipe and produces an indicator light on the top of the pushbutton, the indicator light identifying an amperage amount, shown on the top of the pushbutton, of a specific breaker circuit.

2. The programmable pushbutton breaker switch of claim 1, wherein a single push of the pushbutton places the programmable pushbutton breaker switch into a programming mode, wherein pushing and holding and then releasing the pushbutton identifies, with an indicator light on the top of the pushbutton, a breaker amperage amount currently set in the programmable pushbutton breaker switch, wherein single pushes of the pushbutton allow selections of breaker amperage amounts, from a plurality of amperage amounts, identified by an indicator light on the top of the pushbutton, wherein pushing and holding the pushbutton and releasing the pushbutton then sets and stores a selected breaker amperage, and wherein a single push of the pushbutton then returns the programmable pushbutton breaker switch to an operable mode.

3. The programmable pushbutton breaker switch of claim 1, wherein the light pipes are held in a light pipe mounting member positioned in an interior of the pushbutton, the light pipe mounting member having a plurality of evenly spaced apart channels for holding the light pipes and having a hollow interior for allowing transmission of background light from a background LED mounted on the integrated LED circuit board.

4. The programmable pushbutton breaker switch of claim 1, further comprising a programming cap attached removably to the top of the pushbutton, the programming cap having amperage amount numbers printed thereon, the amperage amount numbers being aligned with the light pipes and each amperage amount number indicating the amperage amount of the specific breaker circuit of the specific light pipe with which the amperage amount number is aligned.

5. The programmable pushbutton breaker switch of claim 1, further comprising a programming switch mounted on the support structure, wherein turning the programming switch on and off provides electrical signals to a computer system mounted on the support structure and wherein electrical signals from the programming switch are processed by the computer system to allow the operation of the pushbutton to select a desired breaker amperage amount from a plurality of breaker amperage amounts shown on the top of the pushbutton and to set and store the desired amperage amounts in the computer system.

6. A programmable pushbutton breaker switch, comprising:

a) a housing having a top end, a bottom end, and an interior;

b) a pushbutton positioned in the interior at the top end of the housing;

c) an integrated LED circuit board connected to a plurality of amperage indicating light emitting diodes (LEDs) mounted on a support structure in the interior of the housing and below the pushbutton;

d) a plurality of breaker circuits on an integrated breaker circuit board in the interior of the housing mounted on the support structure;

e) a plurality of LED light pipes in an interior of the pushbutton; and f) each of the LEDs being associated with a specific breaker circuit and with a specific light pipe, wherein the plurality of light pipes and the pushbutton are constructed so that light from a specific LED passes through a specific LED light pipe and produces an indicator light on the top of the pushbutton, the indicator light identifying an amperage amount, shown on the top of the pushbutton, of a specific breaker circuit, wherein a single push of the pushbutton places the programmable pushbutton breaker switch into a programming mode, wherein pushing and holding and then releasing the pushbutton identifies, with an indicator light on the top of the pushbutton, a breaker amperage amount currently set in the programmable pushbutton breaker switch, wherein single pushes of the pushbutton allow selections of breaker amperage amounts, from a plurality of amperage amounts, identified by an indicator light on the top of the pushbutton, wherein pushing and holding the pushbutton and releasing the pushbutton then sets and stores a selected breaker amperage, wherein a single push of the pushbutton then returns the programmable pushbutton breaker switch to an operable mode, and wherein the light pipes are held in a light pipe mounting member positioned in an interior of the pushbutton, the light pipe mounting member having a plurality of evenly spaced apart channels for holding the light pipes and having a hollow interior for allowing transmission of background light from a background LED mounted on the integrated LED circuit board.

7. The programmable pushbutton breaker switch of claim 6, further comprising a programming cap attached removably to the top of the pushbutton, the pushbutton cap having amperage amount numbers printed thereon, the amperage amount numbers being aligned with the light pipes and each amperage amount number indicating the amperage amount of the specific breaker circuit of the specific light pipe with which the amperage amount number is aligned.

8. The programmable pushbutton breaker switch of claim 7, further comprising a programming switch mounted on the support structure, wherein turning the programming switch on and off provides electrical signals to a computer system mounted on the support structure and wherein electrical signals from the programming switch are processed by the computer system to allow the operation of the pushbutton to select a desired breaker amperage amount from a plurality of breaker amperage amounts shown on the top of the pushbutton and to set and store the desired amperage amounts in the computer system.

9. A programmable pushbutton breaker switch, comprising:

a) a housing having a top end, a bottom end, and an interior;

b) a pushbutton positioned in the interior at the top end of the housing;

c) an integrated LED circuit board connected to a plurality of amperage indicating light emitting diodes (LEDs) mounted on a support structure in the interior of the housing and below the pushbutton;

d) a plurality of breaker circuits on an integrated breaker circuit board in the interior of the housing mounted on the support structure;

e) a plurality of LED light pipes in an interior of the pushbutton;

f) each of the LEDs being associated with a specific breaker circuit and with a specific light pipe, wherein the plurality of light pipes and the pushbutton are constructed so that light from a specific LED passes through a specific LED light pipe and produces an indicator light on the top of the pushbutton, the indicator light identifying an amperage amount, shown on the top of the pushbutton, of a specific breaker circuit;

g) a programming switch mounted on the support structure, wherein turning the programming switch on and off provides electrical signals to a computer system mounted on the support structure and wherein electrical signals from the programming switch are processed by the computer system to allow the operation of the pushbutton to select a desired breaker amperage amount from a plurality of breaker amperage amounts shown on the top of the pushbutton and to set and store the desired amperage amounts in the computer system; and h) a programming cap attached removably to the top of the pushbutton, the programming cap having amperage amount numbers printed thereon, the amperage amount numbers being aligned with the light pipes and each amperage amount number indicating the amperage amount of the specific breaker circuit of the specific light pipe with which the amperage amount number is aligned, wherein a single push of the pushbutton places the programmable pushbutton breaker switch into a programming mode.

10. The programmable pushbutton breaker switch of claim 9, wherein the light pipes are held in a light pipe mounting member positioned in an interior of the pushbutton, the light pipe mounting member having a plurality of evenly spaced apart channels for holding the light pipes and having a hollow interior for allowing transmission of background light from a background LED mounted on the integrated LED circuit board.

* * * * *